United States Patent
Patil et al.

(10) Patent No.: US 10,678,553 B2
(45) Date of Patent: Jun. 9, 2020

(54) PRO-ACTIVE GPU HARDWARE BOOTUP

(71) Applicant: Apple Inc., Cupertino, CA (US)

(72) Inventors: Rohan Sanjeev Patil, San Francisco, CA (US); Gokhan Avkarogullari, San Jose, CA (US); Tatsuya Iwamoto, Foster City, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 15/961,086

(22) Filed: Apr. 24, 2018

(65) Prior Publication Data

US 2019/0108037 A1    Apr. 11, 2019

Related U.S. Application Data

(60) Provisional application No. 62/570,551, filed on Oct. 10, 2017.

(51) Int. Cl.

| | |
|---|---|
| *G06F 15/177* | (2006.01) |
| *G06F 9/00* | (2006.01) |
| *G06F 9/4401* | (2018.01) |
| *G06F 1/3206* | (2019.01) |
| *G06T 15/00* | (2011.01) |
| *G06F 9/50* | (2006.01) |
| *G06T 1/20* | (2006.01) |

(52) U.S. Cl.
CPC .......... *G06F 9/4403* (2013.01); *G06F 1/3206* (2013.01); *G06F 9/4418* (2013.01); *G06F 9/5027* (2013.01); *G06T 1/20* (2013.01); *G06T 15/005* (2013.01)

(58) Field of Classification Search
CPC .... G06F 9/4403; G06F 9/4418; G06F 9/5027; G06F 1/3206; G06F 9/5094; G06F 2209/509; G06T 1/20; G06T 15/005
See application file for complete search history.

(56) References Cited

U.S. PATENT DOCUMENTS

| | | |
|---|---|---|
| 8,339,404 B2 | 12/2012 | Pryor |
| 8,745,366 B2 | 6/2014 | Wyatt |
| 2013/0038615 A1* | 2/2013 | Hendry ................. G06F 1/3206 345/502 |
| 2017/0061568 A1* | 3/2017 | Metz ..................... G06F 1/3206 |
| 2018/0089881 A1 | 3/2018 | Johnson |

\* cited by examiner

*Primary Examiner* — Xuxing Chen
(74) *Attorney, Agent, or Firm* — Blank Rome LLP

(57) ABSTRACT

One disclosed embodiment includes a method of graphics processing. The method includes receiving an indication to update a current frame on a display. A plurality of graphics command are determined to be associated with a next frame that replaces the current frame. A power-up command is generated based on the received indication, configured to cause GPU hardware to begin an initialization operation. The central processing unit processes the plurality of graphics command. Prior to completely process the plurality of graphics command, a power-up command is sent to a GPU firmware. The GPU firmware initializes the GPU hardware based on the power-up command. The processed plurality of graphics command is also transmitted to the GPU hardware. The GPU hardware executes the processed plurality of graphics command to render the next frame on the display.

20 Claims, 8 Drawing Sheets

| 370 APPLICATION A | 371 PHOTOS | 372 QUICKEN | 373 IMOVIE | 374 APPLICATION B |
|---|---|---|---|---|
| 360 OTHER APPLICATION SERVICES | 361 SPRITEKIT | 362 SCENE KIT | 363 CORE ANIMATION | 364 CORE GRAPHICS |
| 350 O/S SERVICES | 351 OPENGL | 352 METAL | 353 SOFTWARE RAYTRACER | 354 SOFTWARE RASTERIZER |

O/S KERNEL 345

HARDWARE 340

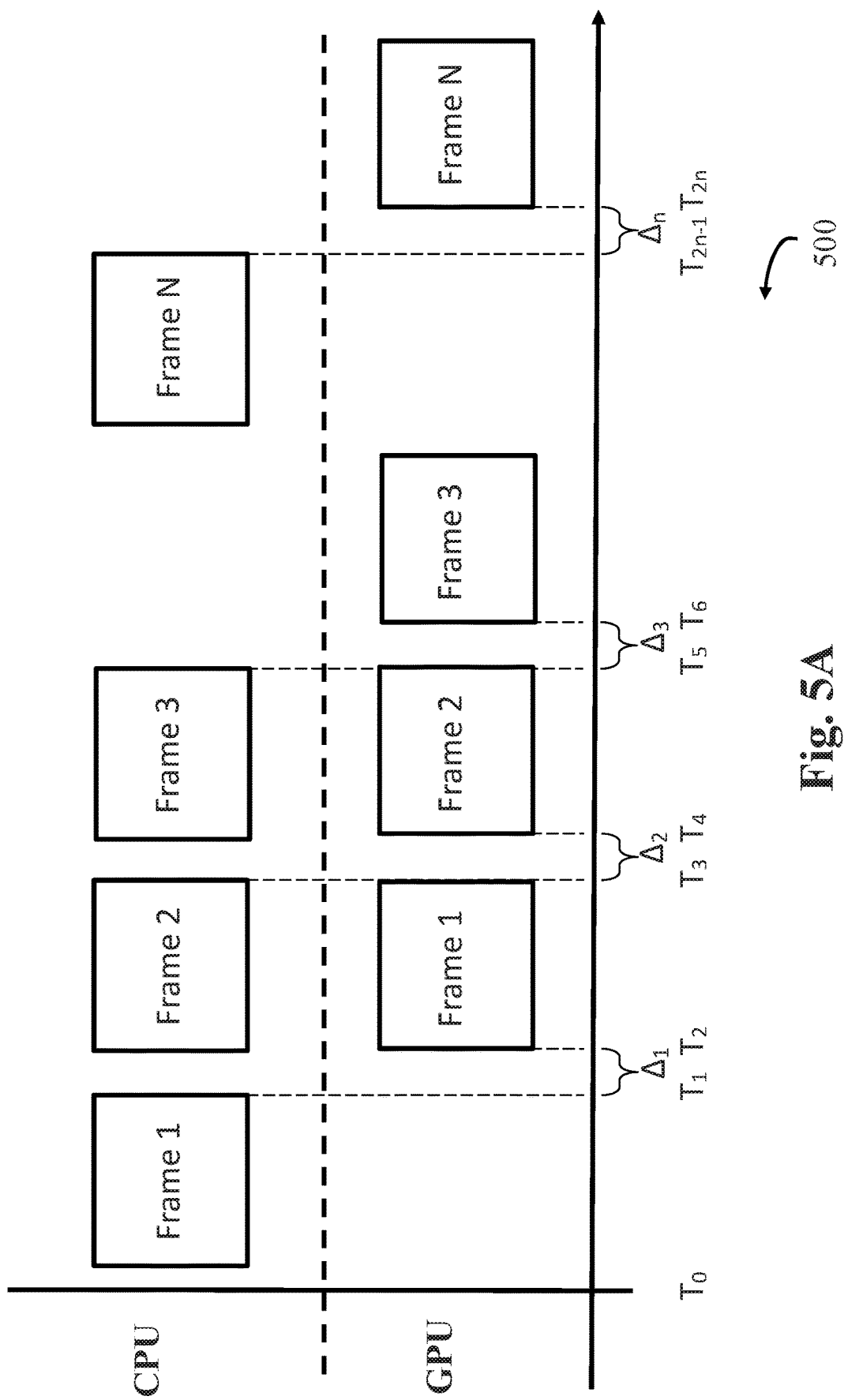

PRO-ACTIVE GPU HARDWARE BOOTUP

BACKGROUND

The disclosed subject matter relates to the field of graphic processing. More specifically, but not by way of limitation, the disclosed subject matter relates to proactively powering-up graphics processing unit (GPU) hardware in order to expedite executing of the graphics commands.

Computers and other computational devices typically have at least one programmable processing element that is generally known as a central processing unit (CPU). They frequently also have other programmable processors that are used for specialized processing of various types, such as graphic processing operations which may be performed by graphic processing units (GPUs). GPUs generally comprise multiple cores or processing elements designed for executing the same instruction on parallel data streams, making GPUs more effective than general-purpose CPUs for algorithms in which processing of large blocks of data is done in parallel. In general, a CPU functions as the host and hands-off specialized parallel tasks to the GPUs.

In order for a frame to be rendered on a display, the GPU and the CPU must work together. The number of frames displayed per second (FPS) is referred to as a frame rate. At lower frame rates, the human eyes can distinguish still frames displayed in rapid succession. However, at higher frame rates, individual frames are not perceptible to a human and instead appear as seamless motion. Therefore, everything else being equal (e.g. resolution), a display with a higher frame rate provides a higher graphic quality.

Sometimes the actual frequency by which a display is updated is capped by the display's refresh rate. The refresh rate is the number of times the display can be redrawn in a second. Vertical Synchronization (Vsync) is used to synchronize the refresh rate of a display with the frame rate. To take full advantage of a display's high refresh rate, the frame rate provided by the GPU and CPU must be as high as the display's refresh rate permits. Otherwise, the display may be forced to render the same frame during multiple refresh periods, which may be perceived by a human as lower quality video.

SUMMARY

One disclosed embodiment includes a method of graphics processing. The method includes receiving an indication to update a current frame on a display. A plurality of graphics command are determined to be associated with a next frame that replaces the current frame. A power-up command is generated based on the received indication, configured to cause GPU hardware to begin an initialization operation. The CPU processes the plurality of graphics command. Prior to completely processing the plurality of graphics command, the power-up command is sent to a GPU firmware. The GPU firmware initializes the GPU hardware based on the power-up command. The processed plurality of graphics command is also transmitted to the GPU hardware. The GPU hardware executes the processed plurality of graphics command to render the next frame on the display. In one embodiment, GPU hardware starts initialization prior to receiving the processed plurality of graphics commands for the execution. In yet another embodiment, the GPU hardware is fully initialized prior to receiving the processed plurality of graphics commands for the execution.

In another disclosed embodiment, an apparatus that comprises a processing device that includes a CPU and a GPU. The processing device is configured to execute program code stored in that receives an indication to update a current frame on a display and determines a plurality of graphics commands associated with a next frame to replace the current frame on the display. Based on the received indication, the processing device generates a power-up command configured to cause GPU hardware to begin a power-up operation. The CPU meanwhile is processing a plurality of graphics commands for one or more command buffers. The GPU firmware receives the power-up command prior to completely processing the plurality of graphics commands. The GPU firmware initializes the GPU hardware based on the power-up command. Afterwards, the GPU hardware executes the graphics command committed for execution by the CPU.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

FIG. 3 is a block diagram showing an illustrative software architecture diagram according to one or more embodiments of the disclosed subject matter according to an embodiment of the disclosure.

FIG. 5A is a timing diagram illustrating synchronization between CPU and GPU according to one embodiment of the disclosure.

DETAILED DESCRIPTION

Figure 1:
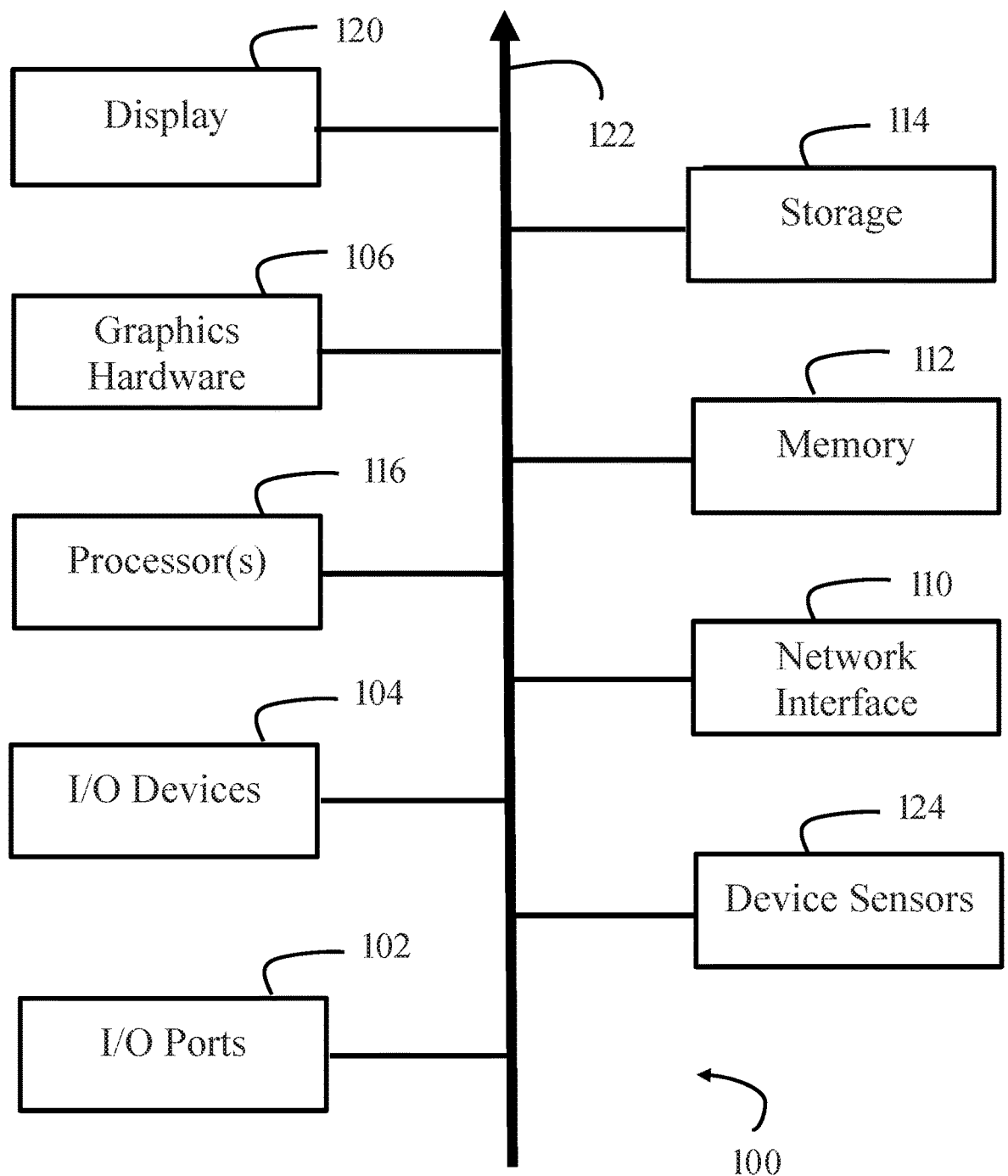
FIG. 1 is a block diagram illustrating a computer system that may be used, for example, as an end-user or developer computer system according to an embodiment of the disclosure.

As noted above, video quality may be less than desirable if the frame rate of the CPU/GPU is less than the refresh rate of the display. The disclosed embodiments address this issue by proactively powering up the GPU hardware in order to expedite rendering of the graphics data. In one aspect, the processing of the graphics commands is performed in parallel with initialization of the GPU hardware. For example, in response to a determination that the GPU is to be used for rendering of a next frame, a power-up command is communicated to the GPU. Therefore, when the graphics commands are processed and ready to be executed by the GPU hardware, initialization of the GPU has already begun. In such embodiments, the GPU hardware is fully initialized by the time the graphics commands are ready to be executed on the GPU hardware.

Embodiments described in more details below reduce (and in some embodiments eliminate) a delay between the processing of the graphics commands by CPU and their execution by the GPU. Therefore, in some instances, reducing this delay time provides sufficient opportunity for on-time execution of the graphics commands on the GPU at a lower speed. In such a scenario, the GPU hardware's power consumption is reduced. In other instances, the disclosed techniques reduce the risk of dropping a frame within the designated frequency period because the frame could not be rendered on time.

In the following description, for purposes of explanation, numerous specific details are set forth in order to provide a thorough understanding of the invention. It will be apparent, however, to one skilled in the art that the disclosed examples may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment, and multiple references to "one embodiment" or "an embodiment" should not be understood as necessarily all referring to the same embodiment.

As used herein, the term "a computer system" refers to a single computer system or a plurality of computer systems working together to perform the function described as being performed on or by a computer system. Similarly, a machine-readable medium can refer to a single physical medium or to a plurality of media that may together contain the indicated information stored thereon. Reference to a processor refers to a single processing element or to a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of systems having the benefit of this disclosure and being of ordinary skill in the design and implementation of computing systems and/or graphic systems.

Referring to FIG. 1, the disclosed embodiments may be performed by representative computer system 100. For example the representative computer system 100 may act as a software development platform or an end-user device. While FIG. 1 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems and other consumer electronic devices, etc.) which have fewer components or perhaps more components may also be used to implement one or more embodiments.

As illustrated in FIG. 1, computer system 100 includes bus 122 which is coupled to one or more processor(s) 116, which may be CPUs and/or digital signal processors (DSPs), memory 112, which may include one or both of a volatile read/write random access memory (RAM) and a read-only memory (ROM), and a non-volatile storage device 114 (e.g., a solid state storage drive). Processor(s) 116 may retrieve instructions from the memory 112 and/or storage device 114 and execute the instructions to perform operations described herein. Bus 122 interconnects these various components together and also interconnects processor 116, memory 112, and storage device 114 to display 120, I/O ports 102 and peripheral devices such as input/output (I/O) devices 104. I/O devices 104 may be pointing devices such as a mouse or stylus, keyboards, touch screens (e.g., display 120 and I/O devices 104 may be implemented as a single touch-sensitive display), modems, network interfaces, printers and other devices. Typically, Input/output devices 104 are coupled to the system through an input/output controller(s).

Computer system 100 may also include or be coupled to device sensors 124. Devices sensors 124 may include one or more of: depth sensors (such as a depth camera), three-dimensional (3D) depth sensor(s), imaging devices (such as a fixed and/or video-capable image capture unit), red-green-blue (RGB) sensors, proximity sensors, ambient light sensors, accelerometers, gyroscopes, any type of still or video camera, light detection and ranging (LIDAR) devices, Global Positioning Systems (GPS), microphones, charge coupled devices (CCDs) (or other image sensors), infrared sensors, thermometers, etc. These and other sensors may work in combination with one or more GPUs, digital signal processors (DSPs), or conventional microprocessors along with appropriate programming so that the sensor outputs may be properly interpreted and/or combined and interpreted.

Device sensors 124 may capture contextual and/or environmental phenomena such as time; location information; the status of the device with respect to light, gravity, a magnetic field (e.g., a magnemometer); still and video images, etc. In addition, network-accessible information, such as weather information, may also be collected and used as part of the context captured by the device sensors. All captured contextual and environmental phenomena may be used to provide context to user activity or information about user activity. For example, in accessing or determining a gesture or the expression or emotion of a user, the contextual information may be used as part of the contextual analysis. Computer system 100 may react to environmental and contextual actions and reflect a reaction in real-time on the display system through use of the graphic hardware 106.

Where volatile RAM is included in memory 112, the RAM may be implemented as dynamic RAM (DRAM), which requires continuous power in order to refresh or maintain the data in the memory. Graphic hardware 106 may be special purpose computational hardware for processing graphic and/or assisting processor(s) 116 in performing computational tasks. In some embodiments, graphic hardware 106 may include CPU-integrated graphic and/or one or more programmable GPUs.

Storage device 114 may be a magnetic hard drive, an optical drive, a non-volatile solid-state storage drive, or other types of storage systems, which maintain data (e.g. large amounts of data) even after power is removed from the system (i.e., non-volatile). While FIG. 1 shows that storage device 114 is a local device coupled directly to the rest of the components in the computer system 100, embodiments may utilize a non-volatile storage device which is remote from computer system 100, such as a network storage device which is coupled to the computer system 100 through network interface 110. Network interface may be a wired or wireless networking interface. Bus 122 may include one or more links connected to each other through various bridges, controllers, and/or adapters as is well known in the art. Although only a single element of each type is illustrated in FIG. 1 for clarity, multiple elements of any or all of the various element types may be used as desired.

Figure 2:
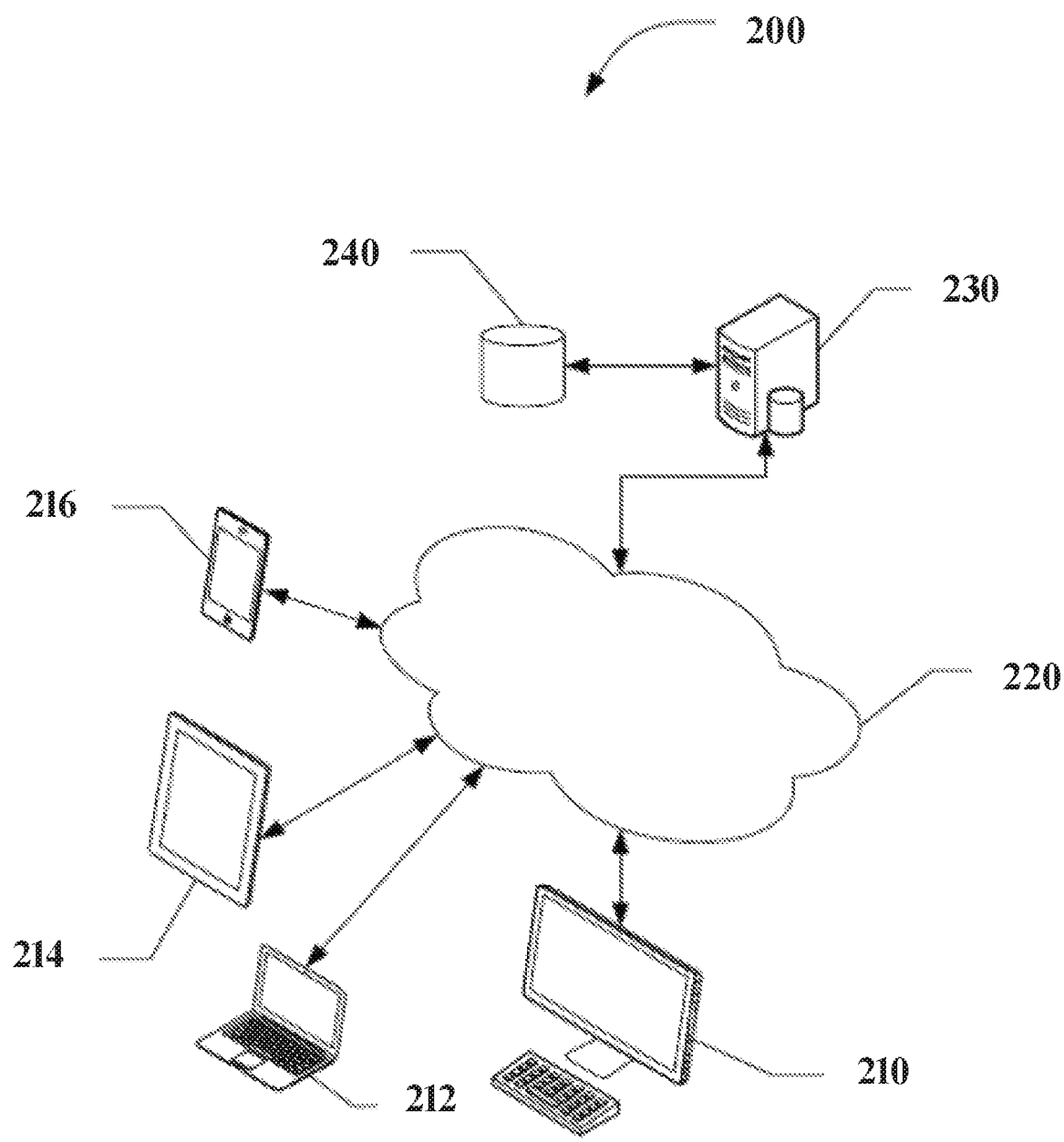
FIG. 2 is a block diagram illustrating a network environment that may be associated with one or more embodiments of the disclosed subject matter according to an embodiment of the disclosure.

Turning now to FIG. 2, a block diagram illustrates a network 200 of interconnected programmable devices, including server 230 and an associated datastore 240, as well as desktop computer system 210, notebook computer system 212, tablet computer system 214, and mobile phone 216. Other types of computer devices may be included as well. Any of these programmable devices may be the developer system or the target system shown as computing system 100 of FIG. 1. Network 220 interconnects the programmable devices and may be any type of network, wired or wireless, local or wide area, public or private, using any desired network communication protocols for transport of data from one system to the other. Although illustrated as a single network 220, any number of interconnected networks may be used to connect the various programmable devices, and each may employ a different network technology.

In one example, desktop system 210 may be a developer system, distributing a graphics application to server 230, which in turn may distribute the graphics application to multiple devices such as systems 212, 214, and 216, each of which may employ a separate GPU. Upon launch of the graphics application, one action performed by the application can be creation of a collection of pipeline objects that may include state information, fragment shaders, and vertex shaders.

As noted above, embodiments of the subject matter disclosed herein include the use and execution of software. As such, an illustrative description of a computing software architecture is provided in a layer diagram in FIG. 3. Like the hardware examples, the software architecture in the example of FIG. 3 discussed herein is not intended to be exclusive in any way, but rather to be illustrative. This is especially true for layer-type diagrams which software developers tend to express in somewhat differing ways. In this case, the description begins with layers starting with the base hardware layer 395 illustrating hardware 340, which may include CPUs and GPUs or other processing and/or computer hardware as described above. Above the hardware layer is the operating system (O/S) kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, all components of a particular software element may not behave entirely in that manner.

Returning to FIG. 3, layer 385 is the O/S services layer, exemplified by O/S services 350. O/S services 350 may provide core O/S functions in a protected environment. In addition, O/S services 350 shown in layer 385 may include frameworks for OPENGL 351, Metal 352, Software Raytracer 353, and a Pure Software Rasterizer 354 (OPENGL is a registered trademark of Silicon Graphic, Inc.). These particular examples all relate to graphics and/or graphics libraries, all of which relate to graphics handling. These particular examples also represent graphics frameworks/libraries that may operate in the lower tier of frameworks, such that developers may use shading and graphic primitives and/or obtain fairly tightly coupled control over the graphic hardware. In addition, the particular examples named in layer 385 may pass their work product directly to hardware or hardware drivers, which may be software y tightly coupled to the hardware.

Referring still to FIG. 3, OpenGL 351 represents an example of a well-known library and application programming interface (API) for graphics rendering including two-dimensional (2D) and 3D graphics. Metal 352 also represents a published graphic library and framework, but it is lower level than OpenGL 351, supporting fine-grained, low-level control of the organization, processing, and submission of graphic and computational commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphic hardware (e.g., using only the CPU). These libraries or frameworks shown within the O/S services layer 385 are only illustrative and are intended to show the general level of the layer and how it relates to other software in a sample arrangement (e.g., lower level kernel operations and higher-level applications services 360). In addition, Metal 352 represents a published framework/library of Apple Inc. usable by developers of graphics applications.

Above the O/S services layer 385 is an application services layer 380, which includes SpriteKit 361, Scene Kit 362, Core Animation 363, and Core Graphics 364. The O/S services layer 385 represents higher-level frameworks that are directly accessed by application programs. In some embodiments the O/S services layer 385 includes graphic-related frameworks that are high level in that they are agnostic to the underlying graphic libraries (such as those discussed with respect to layer 385). In such embodiments, these higher-level graphic frameworks are meant to provide developers access to graphics functionality in a more user- and developer-friendly way and to allow developers to avoid work with shading and graphic primitives. By way of example, SpriteKit 361 is a graphics rendering and animation infrastructure made available by Apple Inc. SpriteKit 361 may be used to animate two-dimensional (2D) textured images, or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphic rendering and animation infrastructure made available from Apple Inc. Core Animation 363 may be used to animate views and other visual elements of an application. Core Graphic 364 is a two-dimensional drawing engine from Apple Inc. Core Graphic 365 provides 2D rendering for applications.

Application layer 375 resides above the application services layer 380. Application layer 375 comprises any number and type of application programs. By way of example, FIG. 3 shows three specific applications: photos 371 (a photo management, editing, and sharing program), QUICKEN 372 (a financial management program, QUICKEN is a registered trademark of Intuit, Inc.), and iMovie 373 (a movie making and sharing program). Application layer 375 also shows two generic applications A 370 and B 374, which represent any other applications that may interact with or be part of the disclosed embodiments. Generally, embodiments of the disclosed subject matter employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce illustrative frameworks that may be discussed herein. Furthermore, in some examples, the frameworks in layer 380 make use of the libraries represented in layer 385. Thus, FIG. 3 provides intellectual reinforcement for these examples. FIG. 3 is not intended to limit the types of frameworks or libraries that may be used in any particular way or in any particular embodiment. Generally, many embodiments of this disclosure propose software activity and architecture in the layers between the hardware 340 and application 375 layers, shown by 397.

With reference again to FIG. 3, some embodiments include the use of higher-level frameworks, such as those shown in application services layer 380. The high-level frameworks may perform intelligent analysis on particular graphics requests from application programs. The high level framework may then choose a specific hardware and/or a specific library or low-level framework to help process the request. In these embodiments, the intelligent analysis may provide for on-the-fly decision making regarding the best path for the graphic request to follow down to hardware.

Figure 4:
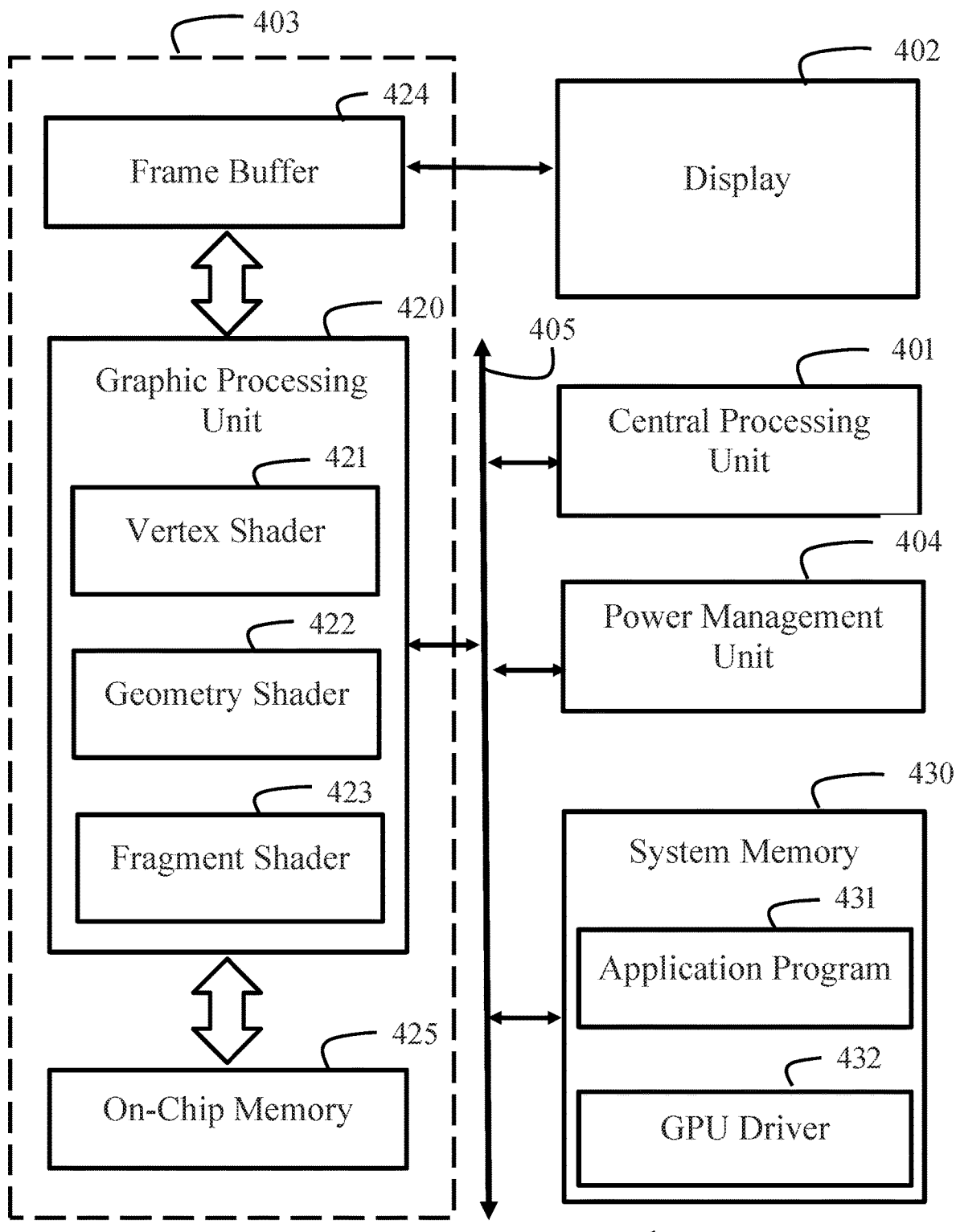
FIG. 4 is block diagram illustrating a computer system for implementing one or more aspects of the disclosed subject matter according to an embodiment of the disclosure.

Referring now to FIG. 4, a block diagram of computing system 400 illustrates a computer system according to an embodiment in additional detail. Computing system 400 includes a CPU 401, a graphic processing system 403, a display 402, a power management unit (PMU) 404, and system memory 430. In one embodiment, CPU 401 and graphics processing system 403 are included on separate integrated circuits (ICs) or IC packages. In other embodiments, however, CPU 401 and graphics processing system 403, or the collective functionality thereof, may be included in a single IC or package.

Data bus 405 connects different elements of the computing system 400 including CPU 401, system memory 430, and graphic processing system 403. In an embodiment, system memory 430 includes instructions that cause the CPU 401 and/or graphics processing system 403 to perform the functions ascribed to them in this disclosure. More specifically, graphics processing system 403 can receive instructions transmitted by CPU 401 and processes the instructions to render and display graphic images on display 402.

System memory 430 may include application program 431 and GPU driver 432. The graphics processing system 403 in this example include a frame buffer 424, a GPU 420 and on-chip memory 425. The GPU 420 includes a vertex shader 421, a geometry shader 422, and a fragment shader 423. The frame buffer 424 may be located on system memory 430. In an embodiment, application program 431 includes code written using an application programming interface (API). An API includes a predetermined, standardized set of commands that are executed by associated hardware. Application program 431 generates API commands to render an image by one or more shading engines of GPU 420 for display. GPU driver 432 translates the high-level shading programs into machine code shading programs that are configured for each of the shading engines, e.g. Vertex Shader 421, Geometry Shader 422, and Fragment Shader 423.

In one embodiment, CPU 401 transmits API commands to GPU 420 to render graphic data and store rendered images in frame buffer 424 to be displayed on display 402. A frame of graphics data is divided into multiple tiles. Each tile may be rendered to on-chip memory 425 by GPU 420. Upon completion of all tiles of a frame, frame buffer 424 may output the image to display 402.

GPU 420 can include a plurality of multiprocessors that are configured to execute multiple threads in parallel. In an embodiment, each of the multiprocessors are configured as a shading engine that includes one or more programmable shaders. Each shader engine executes a machine code shading program to perform image rendering operations. In the embodiment of FIG. 4, the shader engines can be the vertex shader 421, geometry shader 422, and fragment shader 423. In an embodiment, vertex shader 421 handles the processing of individual vertices and vertex attribute data. Unlike vertex shader 421 that operates on a single vertex, the inputs received by geometry shader 422 are the vertices for a full primitive, e.g. two vertices for lines, three vertices for triangles, or single vertex for point. Fragment shader 423 processes a fragment generated by the rasterization into a set of colors and a single depth value.

PMU 404 is responsible of distributing power among different components of computing system 400. Powering-up GPU 420 is part of an initialization operation to prepare GPU 420 for execution of a graphics command. In an embodiment, PMU 404 may access power management policies regarding the power consumption of CPU 401 and GPU 420. For example, a workload may be assigned to CPU 401, GPU 420, or the combination of the two. Then, considering the amount of work required by each component, PMU 404 may optimize power distribution to conserve most energy. In one example, when no workload is assigned to GPU 420 for execution or when GPU 420 is waiting idle for the next workload, PMU 404 may place GPU 420 in a sleep mode and may cause to be minimal, if any, power to be consumed by the GPU 420.

Referring to FIG. 5A, an example of a timing diagram 500 illustrates synchronization between CPU 401 and GPU 420. As discussed above, CPU 401 and GPU 420 are separate and asynchronous processors. CPU 401 and GPU 420 may work in parallel, therefore, neither one of the processing units needs to wait for the other unit before starting to operate. For example, as shown in FIG. 5A, during the period between $T_2$ and $T_3$, while CPU 401 is working on Frame 2, GPU 420 is executing Frame 1.

In one example, CPU 401 encodes commands and GPU 420 executes the encoded commands. A rendering loop for a frame may start with CPU 401 processing the received graphics commands associated with a new frame. Referring to FIG. 5A, CPU 401 starts processing the graphics commands associated with Frame 1 at $T_0$. For example, CPU 401 may write new vertex data into the vertex buffer in system memory 430. In an embodiment, CPU 401 may encode render commands associated with Frame 1 and subsequently commit a command buffer for GPU 420 execution. More specifically, CPU 401 performs high-level operations, for example, allocation of resources, scheduling, calling appropriate instructions (e.g. determining changes to the displayed scenes, movements and location of objects, etc.). The CPU 401 in this example issues instructions and makes calls to libraries, APIs, and graphics subsystems to translate the high-level graphics instructions to graphics code (e.g., shader code) executable by GPU 420. At $T_1$, CPU 401 completes the processing of the graphics commands associated with Frame 1.

At $T_1$, a call is made to initialize GPU 420 in order to execute the one or more commands from the command buffers. A command buffer is a unit of work including a plurality of graphics command created by CPU 401 for execution on GPU 420. The initialization may begin by instructing PMU 404 that a workload is ready for execution by GPU 420. In return, PMU 404 determines the appropriate power and distributes energy from a source (e.g., battery) to GPU hardware. In an embodiment, the initialization of GPU 420 may take a period from $T_1$ to $T_2$. Therefore, $\Delta_1$ is defined as the initialization period, which is equal to $T_2-T_1$. During $\Delta_1$, CPU 401 has completed the processing of the graphics commands associated with Frame 1 but GPU 420 is not ready to start execution of the graphics commands. This period may include the time it takes for the communication between PMU 404 and different components of the system, as well as, stabilization of GPU's internal states such as frequency and voltage levels. The initialization of GPU 420 may take several hundreds of microseconds to one millisecond.

At $T_2$, GPU 420 may start executing the generated buffer command associated with Frame 1. As previously explained, GPU 420 utilizes multiple microprocessors, each implementing several shader engines, to perform the execution of the graphics commands. When GPU 420 completes the execution of the graphics commands at $T_3$, the rendered pixels are drawn into frame buffer 424 to be displayed on Display 402. During the same period from $T_2$ to $T_3$, CPU 401 may start working on the next frame, Frame 2.

Figure 5B:
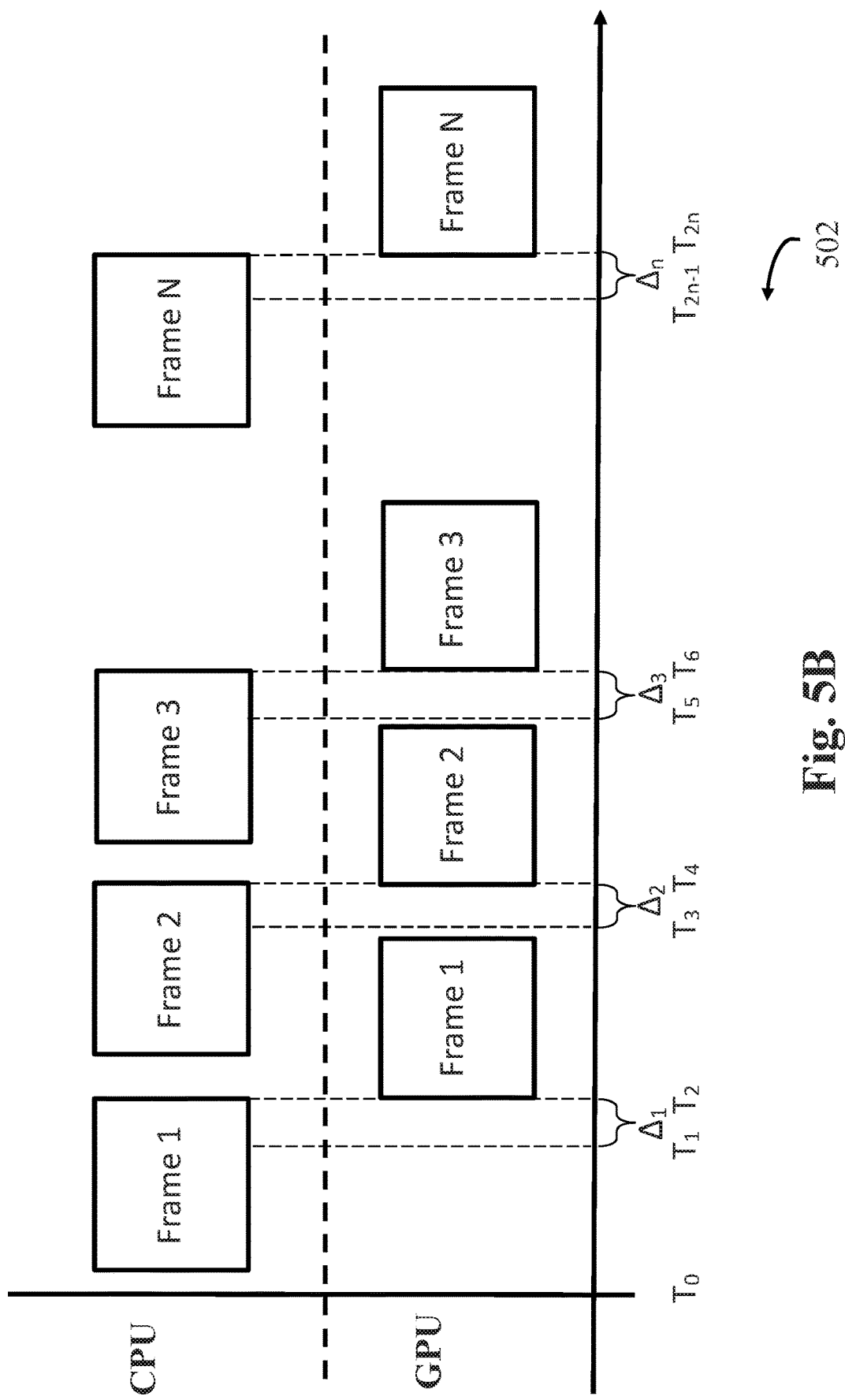
FIG. 5B is a timing diagram illustrating synchronization between CPU and GPU according to another embodiment of the disclosure.

FIG. 5B illustrates an example timing diagram 502 relating to the synchronization between CPU 401 and GPU 420. FIG. 5B is similar to FIG. 5A except that the initialization delays shown as $\Delta_1$, $\Delta_2$, $\Delta_3$, and $\Delta_4$ within FIG. 5A occurs while CPU 401 is processing frames. In particular, the GPU 420 receives power up commands at T1, T3, T5, and $T_{2n-1}$ prior to CPU 401 completing processing frame 1-frame N. Having GPU 420 receive early power up commands increases FPS rate of computing system 400 by reducing the GPU's idle time before the execution of the graphics commands. As shown in FIG. 5B, the operation's idle time between the completion of the processing a frame by CPU 401 and start of the execution by GPU 420 (i.e. $T_2$) is reduced. In one embodiment, at least a portion of the initialization period is performed during the processing of the commands by CPU 401. In particular, GPU 420 receives a command to initialize and power up at T1. When this occurs, the initialization of GPU 420 is conducted in parallel with processing of the graphics commands by the GPU.

In one embodiment, in response to a determination that a command buffer is to be executed by GPU 420, a power-up command is generated. At T1, the power-up command starts initialization of GPU 420. Therefore, instead of waiting for the processing operation to be completed by CPU 401 before starting to power-up GPU 420, the initialization of GPU 420 begins earlier. FIG. 5B illustrates that by the time the processing of commands is completed by CPU 401, GPU 420 is fully initialized and ready for execution. In another embodiment, at least a portion of initialization of GPU 420 is performed at the same time as processing operation of CPU 401. In other words, the commands are not immediately executed by GPU 420 upon completion of processing by CPU 401 and some reduced initialization delay may still exist.

As previously explained, the FPS rate of a system may be limited by a display's refresh rate. Vertical synchronization (Vsync) is used to harmonize FSP rate of the computing system with refresh rate of the display. For example, Vsync interrupt defines the frequency at which the frames on a screen is updated. Therefore, at Vsync interrupt, the content of the frame buffer is switched such that the old frame executed by GPU can be displayed on the screen and the frame buffer is cleared to be written on. In an embodiment, upon receiving a Vsync interrupt, the system determines whether GPU 420 is going be used for execution. If GPU 420 is to be used, at Vsycn interrupt a power-up message is directed to initialize GPU 420.

Figure 6:
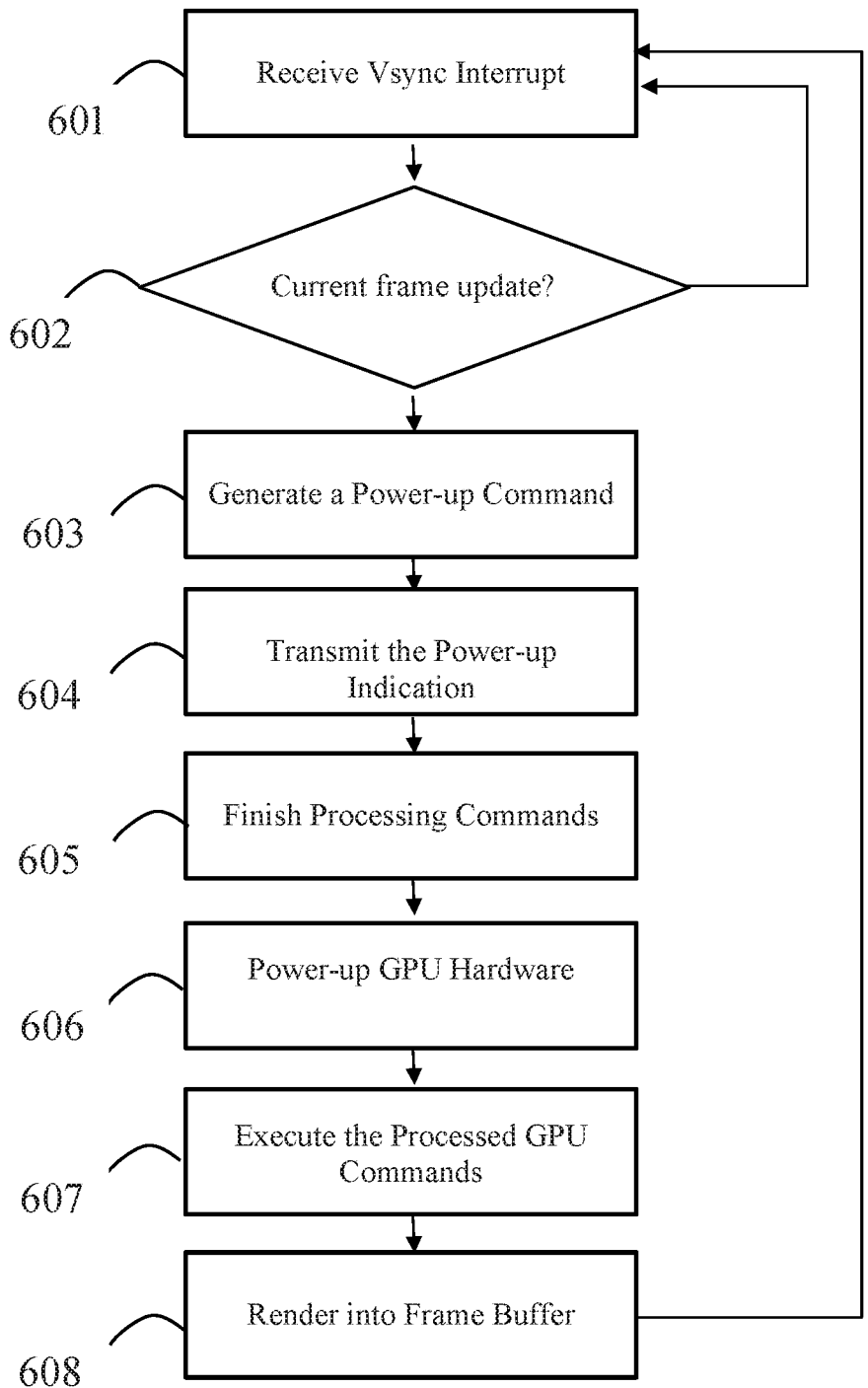
FIG. 6 is a flowchart illustrating an example operation for the communication of a power command to initialize the GPU according to one embodiment of the disclosure.

Referring to FIG. 6, a flow chart depicting the communication of a power command to initialize the GPU is described according to one embodiment. The operations may be performed in the order shown, or in a different order. Further the operations may be performed sequentially, or two or more of the operations may be performed concurrently. At block 601, the loop for refreshing the display screen starts with occurrence of Vsync interrupt. As explained previously, at Vsync interrupt, the system determines whether the current frame needs to be replaced, and therefore, a new frame is to be generated. The frequency of Vsync interrupt depends upon the refresh rate of the display. For example, a Vsync rate at 60 hertz (Hz) generates Vsync interrupts one time every 16 milliseconds. In some implementations, a Vsync rate of 120 Hz is used, thereby generating Vsync interrupts every 8.33 milliseconds.

Figure 7:
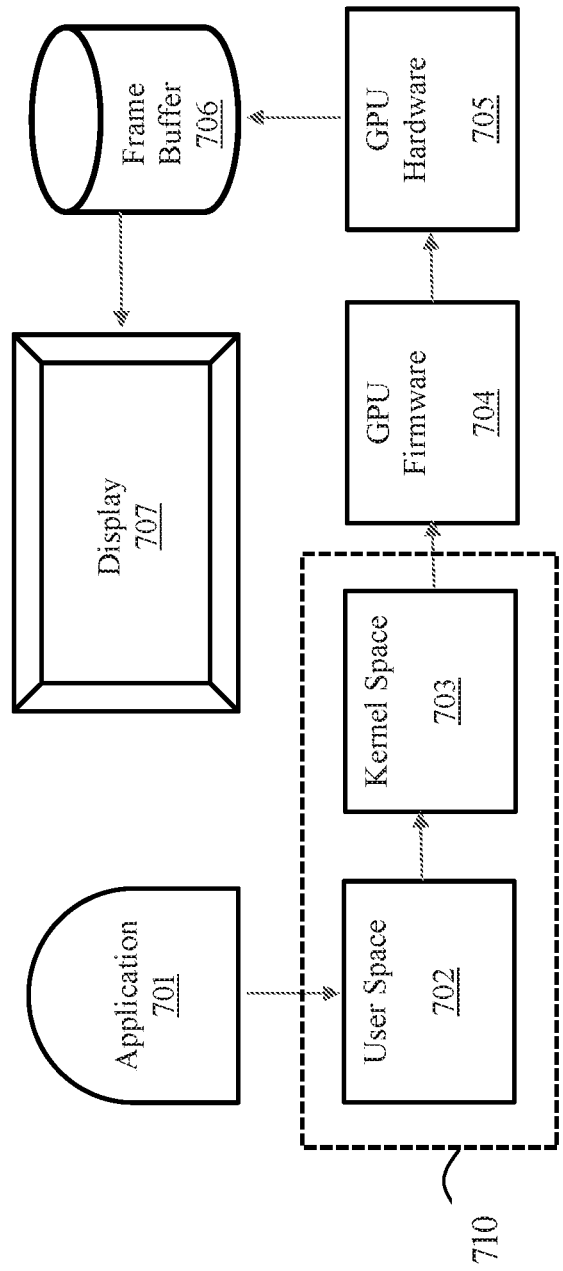
FIG. 7 is a block diagram illustrating a lifecycle of a graphics command from generation to execution by GPU according to one embodiment of the disclosure.

At block 602, a determination is made whether the displayed frame needs to be updated. With reference to FIG. 7, prior to and/or during processing of the displayed frame within the User Space 702, User Space 702 determines that the displayed frame needs to be updated. As shown in FIG. 7, CPU 710 may execute instructions or code in User Space 702. In an embodiment, there may be no changes made to the displayed frame. For example, a still image may have been displayed on the screen with no changes for a period of time. In other instances, the display might have been turned off or put in sleep mode. If the current frame does not need to be updated, the operation proceeds back to block 601 to wait for the next Vsync interrupt.

Alternatively, a graphics-driving event might have occurred, which demands updating the currently displayed frame. Referring to FIG. 7, lifecycle of a graphics command from generation by CPU 710 to execution by GPU Hardware 705 is displayed according to one embodiment of the disclosure. In one embodiment, the graphics driving event may occur based on the interactions between Application 701 and User Space 702. For example, the graphics driving event may be rendering of a video by a decoder, user interface animation, generating a new scene of a game, or a virtual reality simulation. In an embodiment, upon occurrence of a graphics deriving event, high-level logic is executed in User Space 702. For example, shaders are compiled in User Space 702 and API calls from Application 701 may be translated and stored in command buffers before being transferred to Kernel Space 703. If a graphics-driving event occurs, then a determination is made that the displayed frame needs to be updated.

Referring back to FIG. 6, upon making a determination that the currently displayed frame is to be updated, at 603 a power-up command is generated to initialize the GPU hardware. In an example, an interaction of a user with user interface may be an indication that the GPU is to be used that causes User Space 702 to generate a power-up command. Alternatively, User Space 702 may make the determination and issue the power-command based on the graphics commands associated with the next frame. In an embodiment, the power-up command is generated as soon as a determination is made that the GPU is to be used.

In one embodiment, the power-up command is directed to initialize the entire GPU hardware. In alternative embodiments, the power-up command specifies the number of partitions in a GPU that needs to be initialized. For example, the power-up command may instruct to boot-up a particular subset of microprocessors in the GPU based on the capabilities of the microprocessors and the workload to be executed. In one embodiment, an analysis of the graphics command in User Space 702 may be used to determine which subset of microprocessors need to be initialized. In an alternative embodiment, the power-up command is generated before any other operation in User Space 702.

At block 604, the power-up command is transmitted to initialize the GPU hardware. In an embodiment, the power-up command goes through multiple software stacks before reaching its destination. Referring to FIG. 7, in one embodiment, the power-up command is generated in User Space 702, then it is communicated to Kernel Space 703, and finally arrives at GPU firmware 704. GPU Firmware 704 initializes GPU Hardware 705 in response to power-up command. In one embodiment, the GPU firmware 704 communicates with PMU to initiate the power distribution. GPU firmware 704 may be executed by a processor that communicates with GPU hardware 705 and is separate from CPU 710. As an example, the processor could be a microcontroller embedded within the same chip as the GPU hardware 705.

According to one embodiment, the power-up command is transmitted before the processing of graphics commands associated with a particular frame start. In another embodiment, the power-up command is transmitted before the graphics commands are fully processed. Yet in another embodiment, the power-up command is received by GPU Firmware 704 prior to the completion of the processing by the CPU. Finally, the power-up command may result in a full initialization of GPU Hardware 705 before the commands are ready for execution on GPU Hardware 705, according to one embodiment.

At block 605, the CPU completes the processing of the graphics commands associated with the next frame. In an embodiment, the encoded commands are rendered into a command buffer for execution by the GPU. In one embodiment, the commands associated with the next frame go through a plurality of software stacks before being ready for execution on the GPU hardware. For example, the commands may go through the same route of software stacks as the power-up command described at block 604. However, the transmission of the power-up command may take less time than the transmission of the graphics commands. Referring to FIG. 7, in one embodiment, processing of the commands starts at User Space 702 and continues to Kernel Space 703. The driver in Kernel Space 703 prepares the commands for execution on the hardware (e.g. perform memory allocation and scheduling). Finally, the commands reach GPU firmware 704 to be executed on GPU Hardware 705.

At block 606, the power-up command results in initialization of the GPU hardware. In an embodiment, the power-up command is communicated to a PMU unit. The PMU unit may analyze the workload and determine the allocated power to initialize the GPU hardware. In one embodiment, the power-up command may specify more detail as to the particular partitions in the GPU (e.g. microprocessors) that needs to be powered up. The initialization of the GPU may also include boot-up time, for example, the time it takes for the internal states of the GPU hardware to stabilize at a desired voltage level and frequency.

According to one embodiment of the disclosure, by the time the CPU completes the processing of the commands, the GPU hardware is fully initialized. Therefore, there may be no idle time between the processing of the graphics commands by CPU and the execution of the encoded commands by the GPU. In another embodiment, initiation of the power-up command may reduce the idle time but not fully eliminate it.

At block 607, the GPU starts execution of the commands associated with the next frame. As previously explained, the GPU may include a plurality of shader engines to execute the graphics commands to render images of the next frame. At block 608, the rendered images are stored into the frame buffer. Referring to FIG. 7, display 707 accesses the rendered images stored in Frame Buffer 706 to be displayed. The operation then continues by going back to block 601 and wait to receive the next Vsync Interrupt.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed:

1. A method of graphics processing, comprising:
receiving an indication to update a current frame on a display;
determining a plurality of graphics commands associated with a next frame to replace the current frame on the display;
generating, based on the received indication, a power-up command configured to cause graphics processing unit (GPU) hardware to begin a power-up operation;
processing, by a Central Processing Unit (CPU), the plurality of graphics commands;
sending the power-up command to a GPU firmware prior to completely processing the plurality of graphics commands and transmitting the processed plurality of graphics commands to the GPU hardware;
power-up, by the GPU firmware, the GPU hardware based on the power-up command; and
transmitting the processed plurality of graphics commands to the GPU hardware for execution to render the next frame.

2. The method of claim 1, wherein the GPU hardware starts initialization prior to receiving the processed plurality of graphics commands for the execution.

3. The method of claim 1, wherein the GPU hardware is fully initialized prior to receiving the processed plurality of graphics commands for the execution.

4. The method of claim 1, wherein receiving an indication to update a current frame is regulated based on vertical synchronization (Vsync) interrupts.

5. The method of claim 1, wherein sending the power-up command to a GPU firmware comprises transmitting the power-up command through a plurality of software stacks before reaching the GPU firmware.

6. The method of claim 1, wherein powering-up, by the GPU firmware, the GPU hardware comprises:

communicating to a power management unit (PMU) that the plurality of graphics commands are to be executed on the GPU hardware; and distributing, by the PMU, a power necessary to boot-up the GPU hardware for executing of the processed plurality of graphics command.

7. The method of claim 1, wherein receiving an indication to update a current frame is based on a user interaction with a user interface.

8. The method of claim 1, wherein determining a plurality of graphics commands associated with a next frame occurs in a user space.

9. A non-transitory computer readable medium comprising instructions stored thereon to support graphics processing; the instructions when executed cause a computing system to:
  receive an indication to update a current frame on a display;
  determine a plurality of graphics commands associated with a next frame to replace the current frame on the display;
  generate, based on the received indication, a power-up command configured to cause GPU hardware of the computing system to begin an initialization operation;
  process, by a Central Processing Unit (CPU) of the computing system, the plurality of graphics commands;
  send the power-up command to a graphics processing unit (GPU) firmware of the computing system prior to completely processing the plurality of graphics commands;
  initialize, by the GPU firmware, the GPU hardware based on the power-up command;
  transmit the processed plurality of graphics commands to the GPU hardware; and
  execute the processed plurality of graphics commands on the GPU hardware to render the next frame.

10. The non-transitory computer readable medium of claim 9, wherein the GPU hardware starts initialization prior to receiving the processed plurality of graphics commands for execution.

11. The non-transitory computer readable medium of claim 9, wherein the GPU hardware is fully initialized prior to receiving the processed plurality of graphics commands for execution.

12. The non-transitory computer readable medium of claim 9, wherein receiving an indication to update a current frame is regulated based on vertical synchronization (Vsync) interrupts.

13. The non-transitory computer readable medium of claim 9, wherein sending the power-up command to a GPU firmware comprises transmitting the power-up command through a plurality of software stacks before reaching the GPU firmware.

14. The non-transitory computer readable medium of claim 9, wherein initialize, by the GPU firmware, the GPU hardware comprises:
  communicate to a power management unit (PMU) of the computing system that the processed plurality of graphics command are to be executed on the GPU hardware; and
  distribute, by the PMU, a power necessary to boot-up the GPU hardware for executing the processed plurality of graphics command.

15. An apparatus, comprising:
  a memory; and
  a processing device, comprising:
    a central processing unit (CPU); and
    a graphics processing unit (GPU),
  wherein the processing device is configured to execute program code stored in the memory to:
    receive an indication to update a current frame on a display;
    determine a plurality of graphics commands associated with a next frame to replace the current frame on the display;
    generate, based on the received indication, a power-up command configured to cause GPU hardware to begin a power-up operation;
    process, by the CPU, the plurality of graphics commands;
    send the power-up command to a GPU firmware prior to completely processing the plurality of graphics commands;
    power-up, by the GPU firmware, the GPU hardware based on the power-up command;
    transmit the processed plurality of graphics commands to the GPU hardware; and
    execute the processed plurality of graphics commands on the GPU hardware to render the next frame on the display.

16. The apparatus of claim 15, wherein the GPU hardware starts to power-up prior to receiving the processed plurality of graphics commands for execution.

17. The apparatus of claim 15, wherein the GPU hardware is fully initialized prior to receiving the processed plurality of graphics commands for execution.

18. The apparatus of claim 15, wherein receiving an indication to update a current frame is regulated based on vertical synchronization (Vsync) interrupts.

19. The apparatus of claim 15, wherein sending the power-up command to a GPU firmware comprises transmitting the power-up command through a plurality of software stacks before reaching the GPU firmware.

20. The apparatus of claim 15, wherein receiving an indication to update a current frame is based on a user interaction with a user interface.

* * * * *